No. 648,825. Patented May 1, 1900.
J. WOLFF.
PROCESS OF PREPARING SARDINES.
(Application filed Oct. 20, 1899.)
(No Model.)
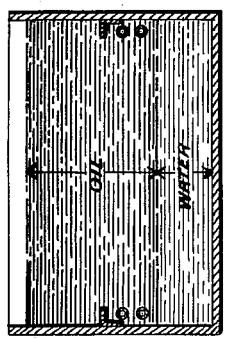
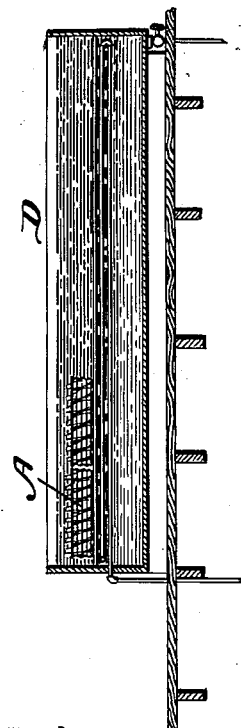
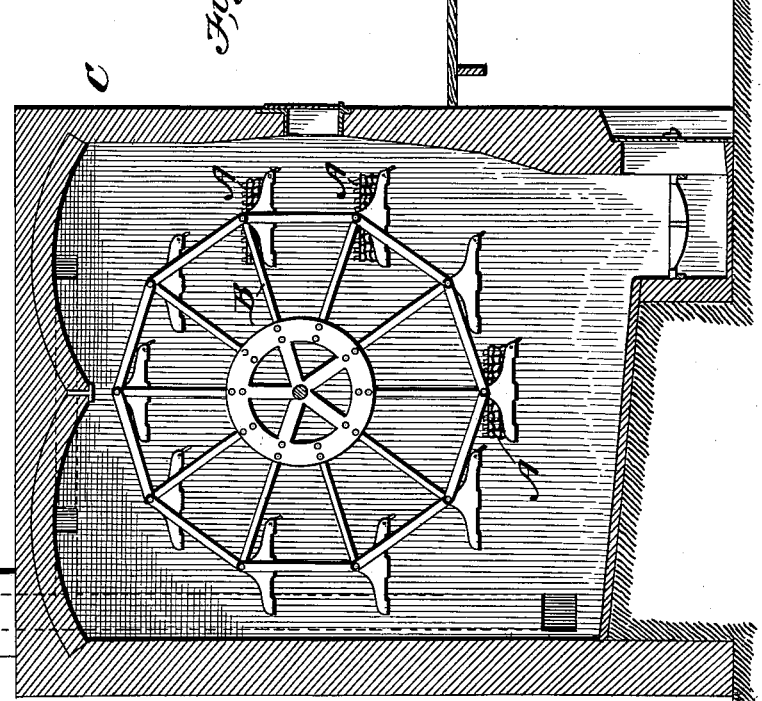
WITNESSES:
INVENTOR
Julius Wolff.
BY
ATTORNEYS

UNITED STATES PATENT OFFICE.

JULIUS WOLFF, OF EASTPORT, MAINE.

PROCESS OF PREPARING SARDINES.

SPECIFICATION forming part of Letters Patent No. 648,825, dated May 1, 1900.

Application filed October 20, 1899. Serial No. 734,192. (No specimens.)

*To all whom it may concern:*

Be it known that I, JULIUS WOLFF, a citizen of the United States, residing at Eastport, in the county of Washington and State of Maine, have invented a new and useful improvement in processes of preparing and putting up "American sardines" (so called) in tin cans, glass jars, or any other suitable receptacle, of which the following is a specification.

The preservation and packing of American sardines is a very important industry in which many thousand persons are engaged. One of the chief difficulties it has had to encounter is deterioration of the product packed in tin cans, which arises from the presence of water in the fish when packed, the two usual processes of preserving and packing being incompetent to eliminate it. Such deterioration is directly due to the water escaping from the fish in the operation of processing and rendering the oil turbid and unpalatable. One of such processes is as follows: After the fish are received at the factories they are properly trimmed, salted, and washed, and next laid out in rows on flakes. They are next dried to a suitable extent in the open air, if the weather permits, or indoors in suitable drying-rooms, if the weather is unfavorable, which it is generally in this particular climate. The fish are then fried in oil in shallow iron pans. This is a slow and unsatisfactory process, in which the fish greatly deteriorate in quality. The other process is as follows: The fish, after being trimmed, salted, and washed, are placed on wire flakes in the raw state in a revolving-reel oven and baked or broiled in it as much as their delicate nature will permit. In this process the fish retain a large percentage of their watery substance, and the process is unsatisfactory for that reason.

I have discovered and put in extensive use a novel and simple process by which all the water may be removed from the fish before they are hermetically sealed in cans, so that subsequent deterioration or destruction of the edible quality of the product is avoided.

In carrying out my improved process I proceed as follows, and to illustrate it I refer to the accompanying drawings, in which—

Figure 1 is a vertical section of a baker's reel-oven and an oil vat or tank provided with a heating attachment. Fig. 2 is a vertical transverse section of the said vat or tank. Fig. 3 is a side view of a wire basket or tray for holding fish while being treated.

The fish are duly trimmed, washed, and salted and then placed head down in woven-wire baskets or trays A, Fig. 3, in which they remain throughout the entire course of treatment. These baskets thus filled with fish are placed on the swinging reel-carriers B, within the oven C, and thus baked by being subjected to a temperature of some 240° to 300° Fahrenheit for about thirty minutes. The baskets A are successively removed from the oven C and instantly deposited in the vat or tank D. This is effected manually and without any perceptible cooling of the fish. The depth of oil in said tank is sufficient to completely submerge the baskets and fish. The stratum of oil rests upon a thinner stratum of water and the former is heated to about 235° Fahrenheit by means of steam-pipes. The baskets or trays A are supported on ways or iron bars, so that they may be intermittently slid through the tank, each basket being introduced at the entrance end of the latter and pushed forward against the adjacent one, whereby the whole series is advanced simultaneously. It will be understood that when the tank is filled with baskets one is removed from the rear or right-hand end of the same as often as another is deposited in the other end of the tank. The progress of a basket through the tank occupies about ten minutes, which suffices to effect the result of eliminating from the fish all the water not removed by the preliminary treatment. During such second stage of the process the water escapes from the oil in the form of steam, and when such escape ceases it is known that the fish are ready for removal from the oil. After such removal the fish are allowed to remain in their original position in the baskets until sufficiently cool for packing in cans in the usual way.

My improved process perfectly attains the desired result of removing all the water from the fish, whereby the value of the packed article is increased. Another important result from a commercial standpoint is attained by reason of the fact that the fish are not individually handled from the beginning to the end of the treatment, but remain throughout undisturbed in the same receptacles in which they were first placed, so that the mutilation and deterioration by rehandling incident to the usual processes are entirely avoided and the fish present a better appearance when placed in the cans, and consequently also when the cans are opened for consumption of the product.

While I have indicated the temperature of the oven and the oil and the periods of treatment which I deem the best in practice, it is to be understood that they may be varied within certain limits without materially affecting the result.

What I claim is—

The improved process of treating fish for preserving them prior to packing in hermetically-sealed cans, which consists in depositing them in receptacles, placing the latter in an oven and baking them for about thirty minutes in a temperature of about 300° Fahrenheit, then removing said receptacles with the fish still held therein and immediately submerging them in oil heated to about 235° Fahrenheit, and retaining them therein until the water remaining in the fish after the baking operation is removed, substantially as shown and described.

JULIUS WOLFF.

Witnesses:
 EBEN A. HOLMES,
 WILBER A. SHEA.